(12) United States Patent
Drouin

(10) Patent No.: US 10,675,542 B2
(45) Date of Patent: *Jun. 9, 2020

(54) METHOD AND SYSTEM FOR TRANSITIONING BETWEEN A 2D VIDEO AND 3D ENVIRONMENT

(71) Applicant: Unity IPR ApS, Copenhagen K (DK)

(72) Inventor: Sylvio Herve Drouin, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,757

(22) Filed: Apr. 18, 2019

(65) Prior Publication Data

US 2019/0240579 A1    Aug. 8, 2019

Related U.S. Application Data

(63) Continuation-in-part of application No. 15/080,536, filed on Mar. 24, 2016, now Pat. No. 10,306,292.

(Continued)

(51) Int. Cl.
| | | |
|---|---|---|
| H04N 13/00 | (2018.01) | |
| A63F 13/60 | (2014.01) | |
| A63F 13/50 | (2014.01) | |
| A63F 13/35 | (2014.01) | |
| A63F 13/493 | (2014.01) | |
| A63F 13/69 | (2014.01) | |

(Continued)

(52) U.S. Cl.
CPC .............. *A63F 13/60* (2014.09); *A63F 13/35* (2014.09); *A63F 13/355* (2014.09); *A63F 13/48* (2014.09); *A63F 13/493* (2014.09); *A63F 13/497* (2014.09); *A63F 13/50* (2014.09); *A63F 13/65* (2014.09); *A63F 13/69* (2014.09); *A63F 13/86* (2014.09); *A63F 2300/66* (2013.01)

(58) Field of Classification Search
None
See application file for complete search history.

(56) References Cited

U.S. PATENT DOCUMENTS 6,285,368 B1    9/2001   Sudo
10,306,292 B2 *  5/2019   Drouin ................. H04N 13/194
(Continued)

OTHER PUBLICATIONS

U.S. Appl. No. 15/080,536, Advisory Action dated Nov. 2, 2018, 3 pgs.

(Continued)

*Primary Examiner* — Christopher G Findley
(74) *Attorney, Agent, or Firm* — Schwegman Lundberg & Woessner, P.A.

(57) ABSTRACT

A system includes a display device, a memory storing 2-dimensional (2D) content and 3-dimensional (3D) game content associated with a content item, and a playback engine. The playback engine is configured to receive the 2D content, the 2D content including one or more reference identifiers (IDs), display the 2D content on the display device for a user and, during display of the 2D content, receive an indication of a transition event. The playback engine is also configured to determine a transition reference identifier (ID) from the one or more reference IDs, identify the 3D game content based on the transition reference ID, render a 3D game environment based on the 3D content, and transition the display device from the displaying the 2D content to providing the 3D game environment.

20 Claims, 9 Drawing Sheets

Related U.S. Application Data

(60) Provisional application No. 62/137,709, filed on Mar. 24, 2015.

(51) Int. Cl.

| | | |
|---|---|---|
| *A63F 13/497* | (2014.01) | |
| *A63F 13/86* | (2014.01) | |
| *A63F 13/65* | (2014.01) | |
| *A63F 13/355* | (2014.01) | |
| *A63F 13/48* | (2014.01) | |

(56) References Cited

U.S. PATENT DOCUMENTS

| | | |
|---|---|---|
| 2004/0027267 A1 | 2/2004 | Rousso |
| 2007/0296721 A1 | 12/2007 | Chang et al. |
| 2012/0329527 A1 | 12/2012 | Kang et al. |
| 2015/0231503 A1 | 8/2015 | Kruglick |
| 2016/0286208 A1 | 9/2016 | Drouin |

OTHER PUBLICATIONS

U.S. Appl. No. 15/080,536, Corrected Notice of Allowability dated Mar. 19, 2019, 2 pgs.

U.S. Appl. No. 15/080,536, Final Office Action dated Aug. 10, 2018, 12 pgs.

U.S. Appl. No. 15/080,536, Non Final Office Action dated Jan. 11, 2018, 11 pgs.

U.S. Appl. No. 15/080,536, Notice of Allowance dateed Jan. 14, 2019, 8 pgs.

U.S. Appl. No. 15/080,536, Response filed Apr. 10, 2018 to Non Final Office Action dated Jan. 11, 2018, 10 pgs.

U.S. Appl. No. 15/080,536, Response filed Oct. 10, 2018 to Final Office Action dated Aug. 10, 2018, 12 pgs.

\* cited by examiner

METHOD AND SYSTEM FOR TRANSITIONING BETWEEN A 2D VIDEO AND 3D ENVIRONMENT

CROSS-REFERENCE TO RELATED APPLICATIONS

This application is a continuation-in-part of U.S. patent application Ser. No. 15/080,536, filed Mar. 24, 2016, which claims the benefit of U.S. Provisional Patent Application No. 62/137,709, filed Mar. 24, 2015, each of which is herein incorporated by reference in its entirety.

TECHNICAL FIELD

The present disclosure relates generally to the fields of two-dimensional (2D) video, three-dimensional (3D) video games, and virtual reality and, more specifically, to systems and methods for transitioning between 2D and 3D environments.

BACKGROUND

In recent years there has been a push towards online video generation and distribution with successful sites such as YouTube® and the like. The content of these videos are usually live video recordings, but some digitally animated movies are also present, with the quality of the videos ranging from amateur to professional. While the success of YouTube has increased video traffic on the internet considerably and has shifted at least some control of content to the user, the experience of watching a video online remains similar to watching a video on television. The viewing experience remains primarily passive, consisting mainly of pressing play and watching.

Similarly, video game players of online multiplayer games often broadcast video of live game play. Also, non-playing users can often watch a game played by a 3rd party and broadcast a view of the game along with commentary. These non-playing users are referred to as "hosts" or "casters". Many non-players can tune in and watch the casted games via websites such as Twitch® and YouTube®. Unfortunately for the non-playing viewers, game broadcasts are in a standard video stream viewable on standard video players which do not have any ability for interaction.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1A:
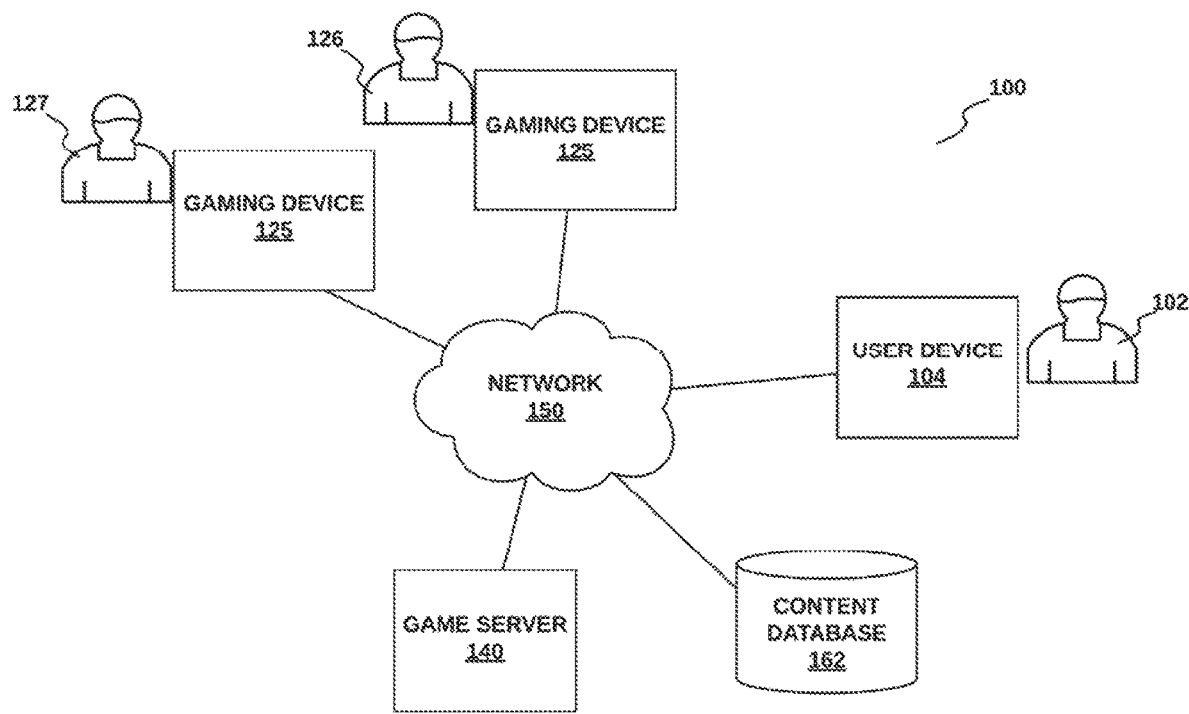
FIG. 1A is a network diagram of an example playback system for transitioning between a 2D video and a 3D game environment, in accordance with an embodiment.

The description that follows describes systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

The terms '2D environment', '2D video', and '2D content' used throughout the description herein are understood to include standard 2D video, as well as 360 degree video (also sometimes referred to in the art as "immersive videos" or "spherical videos") which effectively presents a 2D view of a 3D "world" (e.g., real or otherwise), which may include 360 degree panorama views. In 360-degree videos, the user may have control over the viewing orientation (e.g., via a mouse, or orientation tracking of a phone or head-mounted display, to alter the view).

The term '3D environment' as used throughout the description herein is understood to include 3D digital environments (e.g., 3D game environments, 3D simulation environments, 3D content creation environment, virtual reality environments), and augmented reality environments that include both a digital (e.g., virtual) component and a real-world component.

In accordance with an embodiment, the term 'game object', used herein is understood to include any digital object or digital element within an environment. A game object can represent almost anything within the environment; including characters, weapons, scene elements (e.g., buildings, trees, cars, treasures, and the like), backgrounds (a terrain, sky, and the like), lights, cameras, effects (e.g., sound and visual), animation, and more. A game object includes data that defines properties and behavior for the object.

In accordance with an embodiment, the terms 'asset', 'game asset', and 'digital asset', used herein are understood to include any data that can be used to define a game object or can be used to define an aspect of a game or project. For example, an asset can include data for an image, a 3D model (textures, rigging, and the like), an audio sound, a video, animation, a 3D mesh and the like. The data describing an asset may be stored within a file, or may be contained within a collection of files, or may be compressed and stored in one file (e.g., a compressed file), or may be stored within a memory.

In accordance with an embodiment, the terms 'client' and 'application client' used herein are understood to include a software client or software application that accesses data and services on a server, including accessing over a network.

In accordance with an embodiment, the displaying of 2D content (e.g., displaying a 2D video) may be referred to herein as a "2D mode", whereas displaying and presenting controls for interacting within a 3D game environment may be referred to herein as a "3D mode".

There is described herein systems and methods for transitioning between 2D video and 3D environments (and, in particular, a 3D video game environment). A playback system is provided which enables a user to transition between a 2D video and a 3D video game environment associated with a video game while viewing the 2D video. The video game may be a video game played by an individual user and may be a networked multiplayer video game. The 2D video includes video created from a virtual camera within the 3D video game environment associated with the video game. The 2D video may be created by a player of the game. During viewing of the 2D video, the playback system enables the user to initiate a transition from a 2D viewing context ("2D mode") (e.g., viewing of the 2D video/audio) to a 3D game playing environment ("3D mode") representative of the 3D environment depicted in the 2D video at the time of the transition. While in the 3D mode, the playback system provides game controls that enable the user to control game characters within the 3D environment (e.g., via 3D controls allowing the user to navigate freely through the 3D scene) and play (e.g., join) the video game associated with the 2D video. For example, the user may join a multiplayer video game which is depicted in a 2D video. In accordance with an embodiment, the user joins the video game at the moment at which a transition was initiated, allowing the user to join a game that is in progress (e.g., being played in real-time at the moment the transition is initiated). Such functionality increases user interactivity while watching streamed video content.

More specifically, the 3D game environment is described with 3D game data, which includes data that describes a game environment and a state associated with the game environment. The 3D game data may include data describing game objects (e.g., including meshes, materials, rigging for objects including backgrounds, characters, weapons, special effects and the like) as well as game state data (e.g., including object positions, character health states, weapon status, and the like). Data associated with the 2D video may be relatively small in size (e.g., streaming 2D video content), whereas the amount of associated 3D game data may be relatively large in size.

In the example embodiment, the 2D video and the 3D game data are related. More specifically, the 3D game data includes data that describes a state of a game being displayed in the 2D video. More specifically, the 3D game data includes data that describes objects within a scene associated with the 2D video, including data for a state of each object as well as data for the scale, position and orientation of each object. The 3D game data would also include game metadata describing a state of a game associated with the 2D video, including game character specific data (e.g., character position, character health, character points, character inventory, and the like), and game specific data (e.g., level data). For example, the 2D video may include a game character walking through a kitchen with a weapon. In the video, the kitchen may include objects such as walls, a ceiling, a floor, cabinets, a refrigerator, and a table in the middle of the kitchen. As such, the associated 3D game data may include 3D data needed for rendering each of the objects in the kitchen as well as data describing the state of the game character in the kitchen. In other words, the 3D game data would allow a game engine e.g., using a 3D rendering engine) to reconstruct a scene in a 3D game environment as it appears in the 2D video.

Downloading all 3D game data associated with a 2D video may not be feasible or desirable in certain computing or networking environments. As such, in some embodiments, the playback system stores the 3D game data required to generate the 3D game environment within a database such as to have the 3D game data available "on demand". The database may be on a server and accessible over a network. When a transition is initiated (e.g., a transition from a 2D video to a 3D game environment), then the appropriate 3D game data (e.g., the game data associated with the chosen 2D frame) is downloaded or streamed and converted by the playback system into a 3D game environment and presented to the user for game play.

To enable an "on demand" transition into a 3D game environment, in some embodiments, the playback system links the 2D video and the 3D game data with reference identifiers (IDs) (e.g., ID numbers, timestamps, pointers, or the like). A reference ID links a time position within the 2D video (e.g., a particular frame in the 2D video) with associated elements of the 3D game data (e.g., 3D game data associated with the 2D time position, including data required to construct the 3D game displayed within the 2D frame, including elements that may not be visible in the 2D frame). The 3D game data may include, for example, the geometry, color, texture, and the like of the objects and background within the scene.

In accordance with some embodiments, a reference ID is associated with a particular frame in a 2D video, and in some embodiments, each 2D video frame may have an associated reference ID. In some embodiments, each reference ID includes a timecode identifying a playback time within the 2D video, or alternatively, each reference ID includes a frame number identifying a playback frame within the 2D video. The timecode (or frame number) determines a playback time (or frame) when the 2D video may be interrupted and transitioned into a 3D gaming mode. A reference ID may be provided at every frame, or at regular or irregular intervals throughout the 2D video. In some embodiments, multiple frames (e.g., sequential frames, or various non-sequential frames) showing the same or very similar views of a scene may be assigned the same reference ID (e.g., referencing the same 3D game data from a database), or the multiple frames showing the same or very similar views of a scene may be assigned different timecodes that reference the same 3D game data in the database. In such cases, the 3D game data would be the same for each of the multiple frames and, as such, duplication of the data on the server may be reduced, thereby conserving space within the database and improving efficiency of the system.

In accordance with an embodiment, during operation, the playback system downloads (e.g., to a user device) or streams a 2D video and associated reference IDs, and presents (e.g., displays) the 2D video to a user. The 2D video may include a mechanism (e.g., a button displayed as an overlay on the 2D content) that allows the user to initiate a transition to a 3D game environment at a moment (e.g., at a time chosen by the user). Upon initiation of the transition to the 3D game environment, a reference ID at or near the moment within the 2D video is used to identify the 3D game data associated with the 2D video at the moment. As such, data transfer may be substantially reduced, thereby reducing bandwidth requirements and allowing for more efficient transitions between a 2D mode and a 3D mode.

Turning now to the drawings, systems and methods, including non-routine or unconventional components or operations, or combinations of such components or operations, for transitioning from a 2D video to a 3D game environment in accordance with embodiments of the invention are illustrated. In accordance with an embodiment, FIG. 1A is a network diagram of an example playback system 100 for transitioning between a 2D video and a 3D game environment. In the example embodiment, the playback system 100 includes a user device 104, a game server 140, a content database 162 and a gaming device 125 all coupled in networked communication via a network 150 (e.g., a cellular network, a Wi-Fi network, the Internet, and so forth). The user device 104 is a computing device capable of providing a 2D content and a 3D game environment to a user 102. Although not separately shown in FIG. 1A, in practice the system 100 could have a plurality of user devices 104 and gaming devices 125 connected to the network 150.

Figure 1B:
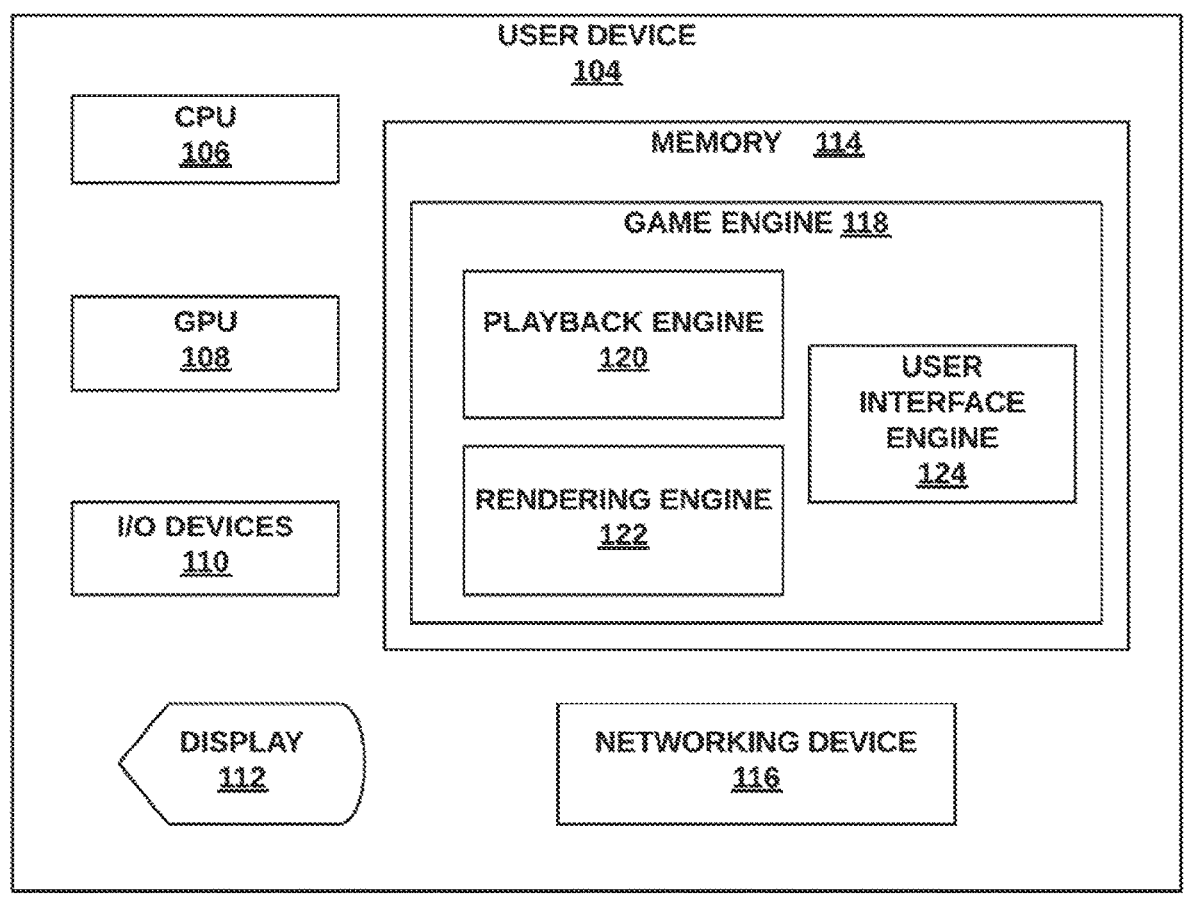
FIG. 1B is a schematic illustrating a user device within a playback system, in accordance with an embodiment.

In accordance with example embodiments, and shown in FIG. 1B, the user device 104 is a computing device capable of providing a 2D content and a 3D game environment to the user 102. In some embodiments, the user device 104 is a mobile computing device (e.g., including a smartphone, laptop, tablet computer, wearable computing device and the like), in other embodiments the user device 104 is a desktop computer or video game console, and in other embodiments, the user device 104 is a head-mounted display (HMD) device worn by the user 102, such as an augmented reality (AR) or virtual reality (VR) visor (e.g., Google Glass®, HTC Vive®, Microsoft HoloLens®, and so forth).

In accordance with an embodiment, the user device 104 includes one or more central processing units (CPUs) 106, and graphics processing units (CPUs) 108. The CPU 106 is any type of processor, processor assembly comprising multiple processing elements (not shown), having access to a memory 114 to retrieve instructions stored thereon, and execute such instructions. Upon execution of such instructions, the instructions implement the CPU 106 to perform a series of tasks or operations as described below in reference to FIG. 2, FIG. 3 and FIG. 4. The user device 104 also includes one or more networking devices 116 (e.g., wired or wireless network adapters) for communicating across the network 150. The user device 104 also includes one or more input devices 110 such as, for example, a keyboard or keypad, mouse, joystick (or other game play device), pointing device, touch screen, or handheld device (e.g., hand motion tracking device). The user device 104 further includes one or more display devices 112, such as a touchscreen of a tablet or smartphone, or lenses or visor of a VR or AR head mounted display (HMD), which may be configured to display virtual objects to the user 102 in conjunction with a real-world view. The display device 112 is driven or controlled by the one or more GPUs 108. The GPU 108 processes aspects of graphical output that assists in speeding up rendering of output through the display device 112.

The user device 104 also includes a memory 114 configured to store a playback engine 120 (e.g., executed by the CPU 106 or GPU 108) that communicates with the display device 112 and also with other hardware such as the input/output device(s) 110 to present 2D content (e.g., a 2D video) to the user 102. The playback engine 120 may include a game engine 118 (e.g., executed by the CPU 106 or GPU 108) that communicates with the display device 112 and also with other hardware such as the input/output device(s) 110 to present a 3D game environment (e.g., a video game) to the user 102. The game engine 118 would typically include one or more modules that provide the following: animation physics for game objects, collision detection for game objects, rendering, networking, sound, animation, and the like in order to provide the user with a video game (or simulation) environment through the display 112. In accordance with an embodiment, the game engine 118 provides a 3D game environment (e.g., rendering objects such as walls, ground, trees, doors, characters, and so forth), and provides controls for the user 102 to move through or interact with the 3D game environment. In accordance with an embodiment, the game engine 118 includes a 3D rendering engine 122 that helps the game engine 118 provide the 3D game environment (e.g., by performing the rendering). In accordance with an embodiment, the game engine 118 includes a user interface engine 124 for providing user interface functionality for the user while watching the 2D video and while playing the 3D game. The memory 114 can be any type of memory device, such as random access memory, read only or rewritable memory, internal processor caches, and the like. Each of the game engine 118, the playback engine 120, and the user interface engine 124 include computer-executable instructions residing in the memory 114 that are executed by the CPU 106 or the GPU 108 during operation. The playback engine 120 may be integrated directly within the game engine 118, or may be implemented as a separate piece of software (e.g., a plug-in).

In accordance with an embodiment, the playback engine 120 may be a video media player responsible for preparing 2D video data for display, performing such operations on the data as decompression, conversion, formatting, and the like. The playback engine 120 may be, for example, a Flash-based player, and a control release for initiating a transition event may be handled with JavaScript commands. The playback engine 120 presents the 2D video to the user 102 (e.g., via the display 112). The playback engine 120 may also provide the user 102 with an input action (e.g., clicking a button) that enables the user 102 to initiate a transition event (e.g., initiating a transition from a 2D mode to a 3D mode, or vice versa). The transfer of control for the display from the 2D mode to the 3D mode may be achieved without closing the playback engine to allow the last video frame to remain visible on the display while preparation of the 3D game environment is completed. This may include, for example, downloading or streaming the 3D game data, constructing the 3D game scene via the rendering engine 122, and displaying the 3D scene via the display device 112. This allows for smooth transitions between the 2D video and 3D game environment.

In accordance with some embodiments, the playback engine 120 may utilize multiple displays 112. For example, the playback engine 120 may present the 2D video on a computer screen or hand-held device display, and then transition to displaying the 3D game environment on a virtual reality (VR) headset in communication with the user device 104.

Figure 1C:
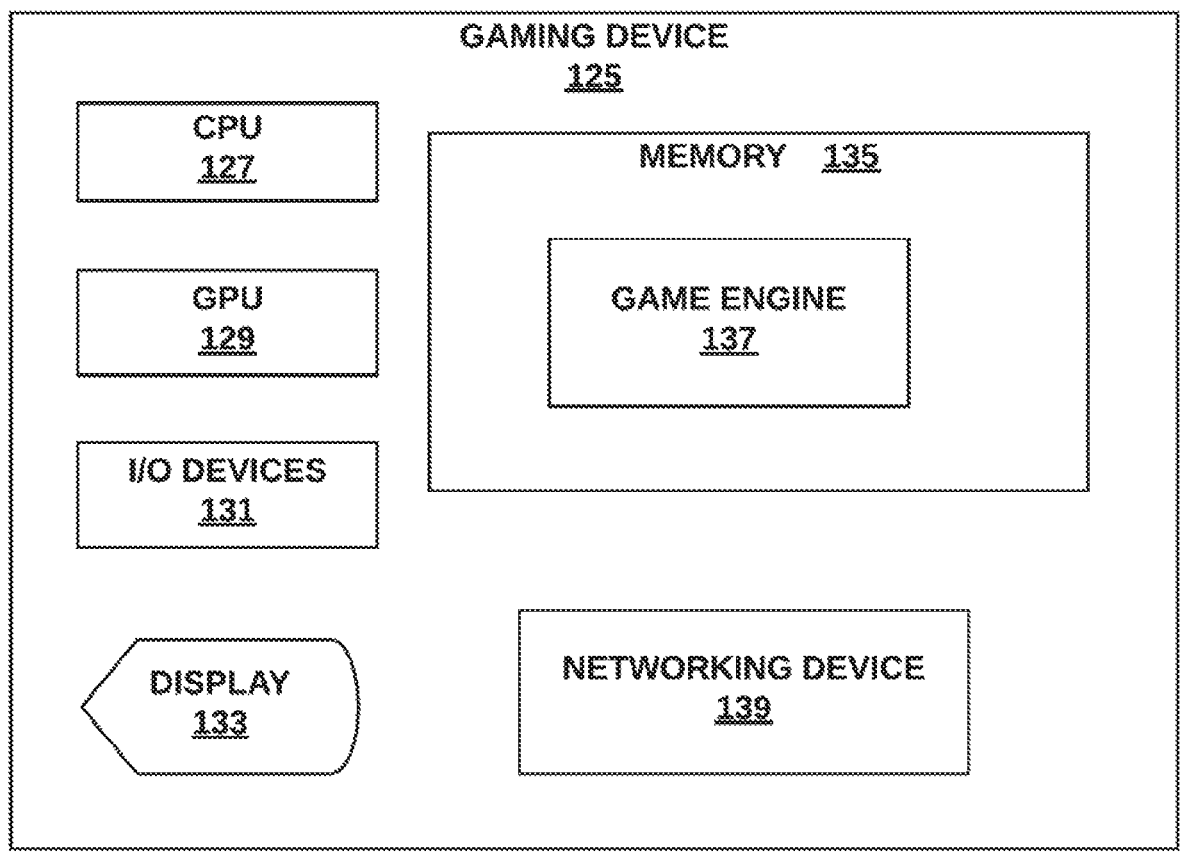
FIG. 1C is a schematic illustrating a gaming device within a playback system, in accordance with an embodiment.

In accordance with example embodiments, and shown in FIG. 1C, is a gaming device 125. The gaming device 125 is a computing device capable of providing a game environment (e.g., 3D video game environment) to a game player 126, 127. In some embodiments, the gaming device 125 is a mobile computing device, such as a smartphone or a tablet computer, in other embodiments the gaming device 125 is a desktop computer or game console.

In the example embodiment, the gaming device 125 includes one or more central processing units (CPUs) 127, and graphics processing units (GPUs) 129. The CPU 127 is any type of processor, processor assembly comprising multiple processing elements (not shown), having access to a memory 135 to retrieve instructions stored thereon, and execute such instructions. Upon execution of such instructions, the instructions implement the CPU 127 to perform a series of tasks as described below in reference to FIG. 2, FIG. 3 and FIG. 4. The gaming device 125 also includes one or more networking devices 139 (e.g., wired or wireless network adapters) for communicating across the network 150. The gaming device 125 also includes one or more input devices 131 such as, for example, a keyboard or keypad, mouse, joystick (or other game play device), pointing device, touch screen, or handheld device (e.g., hand motion tracking device). The gaming device 125 further includes one or more display devices 133, such as a touchscreen of a tablet or smartphone, or lenses or visor of a VR or AR head mounted display (HMD), which may be configured to display virtual objects to the game player 126, 127 in conjunction with a real-world view. The display device 133 is driven or controlled by the one or more GPUs 129. The GPU 129 processes aspects of graphical output that assists in speeding up rendering of output through the display device 133.

The gaming device 125 also includes a memory 135 configured to store a game engine 137 that communicates with the display device 133 and also with other hardware such as the input/output device(s) 131 to present a video game environment to the game player 126, 127. The memory 135 can be any type of memory device, such as random access memory, read only or rewritable memory, internal processor caches, and the like. The game engine 137 includes computer-executable instructions residing in the memory 135 that are executed by the CPU 127 or the GPU 129 during operation.

Figure 1D:
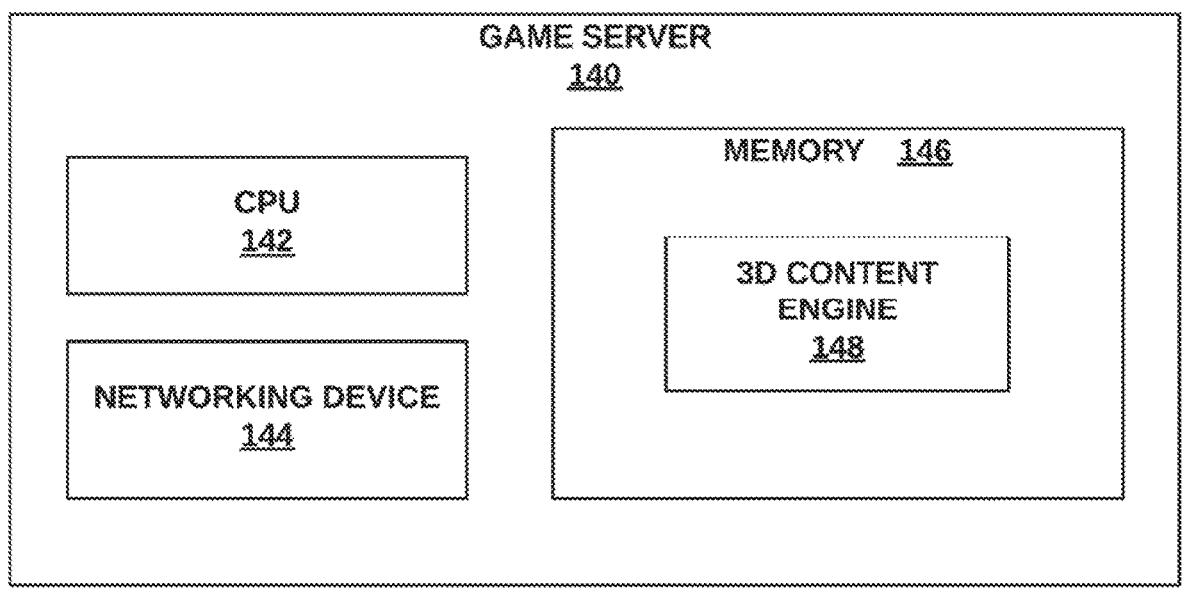
FIG. 1D is a schematic illustrating a game server device within a playback system, in accordance with one embodiment.

In accordance with an embodiment, FIG. 1D shows a game server 140. In the example embodiment, the game server 140 includes a 3D content engine 148 which is configured for providing game server functionality over the network 150. In the example embodiment, during operation, an online game may be set up using a client-server methodology for online games wherein the 3D content engine 148 on the game server 140 runs an authoritative version of the game. Similarly, the game engine 118 on the user device 104 or the game engine 137 on the gaming device 125 acts as a game client and runs (e.g., executes) a local version of the game using data from the game server. The user device 104, gaming device 125 and game server 140 communicate over the network 150 exchanging game data to create a real-time game environment for players 126, 127 and users 102. The 3D content engine 148 on the game server 140 collects game data from players 126, 127 and users 102 via the game engine 137 of the gaming devices 125 and the game engine 118 of the user devices 104 respectively. The 3D content engine 148 runs an authoritative version of the game using the collected data and distributes data from the authoritative version of the game to the clients (e.g., the game engine 118 on the user device 104 or the game engine 137 on the gaming device 125). The game engine 118 on the user device 104 runs a local version of the game and accepts data from the game server 140 (e.g. including the game data from other user devices 104 and gaming devices 125) to update the local version of the game using the server data as the authoritative version (e.g., server data may override local data in case of a discrepancy between server game data and local game data). Similarly, the game engine 137 on the gaming device 125 runs a local version of the game and accepts data from the game server 140 (e.g. including the game data from other user devices 104 and gaming devices 125) to update the local version of the game using the server data as the authoritative version (e.g., server data may override local data in case of a discrepancy between server game data and local game data). The game server 140 may include a content database 162 that includes data from one or more video games.

Figure 2:
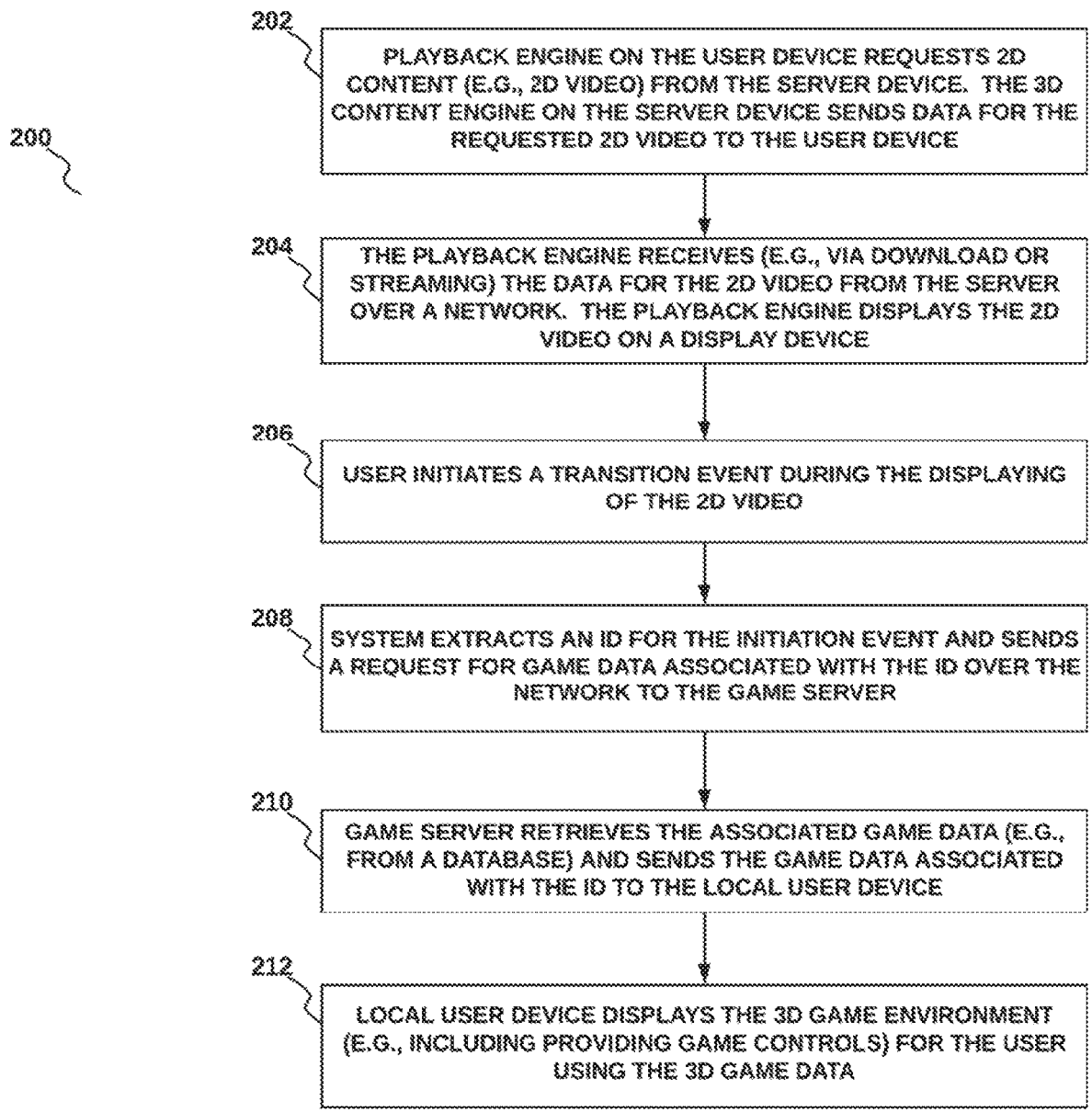
FIG. 2 illustrates a method for transitioning between a 2D video and a 3D game environment, in accordance with an embodiment.

In accordance with an embodiment, and shown in FIG. 2, is a method 200 for transitioning between a 2D mode and a 3D interactive game environment (or 3D mode). More specifically, at operation 202 of the method 200, the playback engine 120 sends a request for 2D content (e.g., a 2D video) over the network 150 to the game server 140. As part of the operation 202, the 3D content engine 148 on the server device 140 receives the request, retrieves data for the requested 2D video, and sends the data for the requested 2D video to the user device 104 over the network 150. In accordance with an embodiment, the 3D content engine 148 retrieves the data for the requested 2D video from the content database 162 (e.g., if it was previously created). In accordance with another embodiment, the 3D content engine 148 retrieves data for the requested 2D video by streaming 2D content generated on a gaming device 125. In accordance with an embodiment, at operation 204, the playback engine 120 receives the data for the requested 2D video over the network 150 and displays the 2D video to the user 102 (e.g., playing a 2D video on the display 112).

In accordance with an embodiment, at operation 206 of the method 200, a user initiates a transition event during the displaying of the 2D content. For example, the playback engine 120 may enable the user to initiate the transition event by pressing a key, using a voice command, or other user-initiated input action), or the playback engine 120 may automatically initiate the transition event (e.g., at a particular point in the 2D video). In some embodiments, the 2D video may include a transition initiation marker that automatically initiates the transition event when the displaying of the 2D video reaches the marker e.g., when the playback engine 120 reaches a frame associated with a transition marker).

In accordance with an embodiment, at operation 208 of the method 200, upon initiation of the transition event, the playback engine 120 extracts an ID for the initiation event. The ID being associated with a time (e.g., a frame) within the 2D video. As part of the operation 208, the playback engine 120 creates a request for 3D game data associated with the ID, and sends the request to the game server 140 over the network 150. In accordance with an embodiment, at operation 210 of the method 200, the 3D content engine 148 retrieves the 3D data associated with the 2D video (e.g., from the content database 162). As part of the operation 210, the 3D content engine 148 sends the 3D game data associated with the IL) to the user device 104 which originally sent the request. In accordance with an embodiment, at operation 212 of the method 200, the playback engine 120 displays the 3D game environment using the 3D game data from the game server 140. The playback engine 120 may use the rendering engine 122 to render aspects of the game environment. The 3D game environment is displayed to the user 102 via the display 112, replacing the view of the 2D video. More specifically, and in the example embodiment, the 3D rendering engine 122 orients the initial view of the 3D game environment such that the 3D game environment appears substantially as seen in the 2D video at the time the transition event is initiated. As such, the user 102 perceives stopping the 2D video and transitioning into the 3D game environment seamlessly (e.g., starting with the same visual perspective).

As part of operation 212, the user interface engine 124 provides game control functionality to the user 102 such that the user 102 may navigate through the 3D game environment, and interactively play the game within the 3D game environment. In accordance with an embodiment, the game controls are described by data provided within the 3D game data. The game controls may be provided to the user via the display device (e.g., on screen controls) or the game controls may be provided to the user via the input/output devices 110 (e.g., such as a joystick) on the user device 104.

In accordance with an embodiment, operation 210 of the method 200 establishes a server-client relationship between the game server 140 and the game engine 118 on the user device 104. The server-client relationship includes the 3D content engine 148 on the game server 140 continuously sending updated and authoritative 3D game data (e.g., synchronized with other user devices 104 and gaming devices 125 playing the game) to the game engine 118 on the user device 104. The server-client relationship also includes the game engine 118 on the user device 104 sending locally generated game data (e.g., from the user 102 interacting with the displayed 3D game) to the game server 140 for inclusion in the authoritative 3D game data.

In accordance with an embodiment, the 3D content engine 148 prepares the 2D video and the 3D game data for use in transition events, and provides the 2D video and 3D game data during a transition event. In the example embodiment, the 3D content engine 148 prepares the data for the 2D video and 3D game data by associating elements of the video with elements of the 3D game data through the use of reference identifiers (IDs). During a transition event, the 3D content engine 148 retrieves 3D game data from the content database 162 and transmits the 3D game data over the network 150 to the game engine 118 on the user device 104 (e.g., upon initiation of a transition event). For example, the 3D game data may be pre-determined and stored on the content database 162 for later use, and may be transferred over the network 150 upon request.

Figure 3:
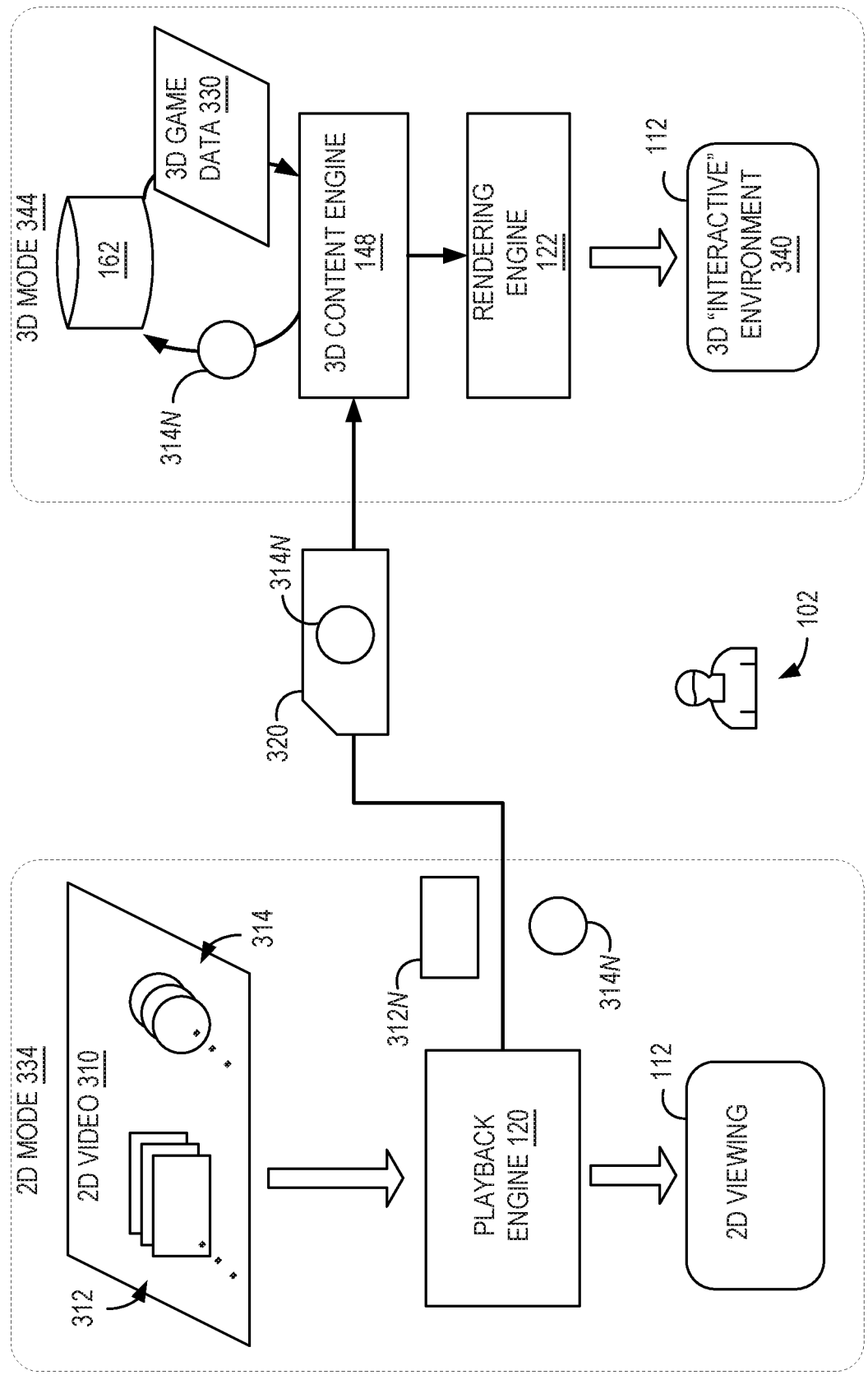
FIG. 3 illustrates a more detailed example transition between the 2D mode and the 3D mode using reference IDs included with a 2D component, in accordance with an embodiment.

In accordance with an embodiment, FIG. 3 illustrates an example transition between a 2D video mode and a 3D gaming mode using reference IDs 314 included within data for a 2D video 310. In accordance with an embodiment, the 2D video mode (or '2D mode') 334 is a mode of the user device 104 whereby the 2D video is displayed to the user 102 via the display device 112. In accordance with an embodiment, the 3D game mode (or '3D mode') 344 is a mode of the user device 104 whereby a 3D game environment 340 is presented to the user via the display device 112.

During operation, the user 102 views the 2D video (e.g., the sequence of video frames 312) via the display 112, as presented by the playback engine 120 in 2D mode 334. At some point during the 2D viewing, a transition event to a 3D mode 344 is initiated (e.g., via an input command submitted by the user 102). The control mechanism to initiate the transition event (e.g., via the user interface engine 124) may be a mouse, keyboard, touch screen, joystick or any other such object. The playback time at which the transition event is initiated is referred to herein as the "transition time" (e.g., a time within the playback of the 2D video).

At the transition time, in the example embodiment, the playback engine 120 pauses the displaying of the 2D video and identifies a "transition frame" 312N. The transition frame 312N is the Nth frame of the set of frames 312 from the 2D video, and represents a frame at which the transition event was initiated.

The playback engine 120 also identifies a reference ID (or "transition reference ID") 314N. In the example embodiment, the playback engine 120 identifies the transition reference ID 314N based on the transition frame 312N. For example, each frame 312 may have an associated reference ID 314 and, as such, the transition frame 312N is associated with the transition reference ID 314N. In other embodiments, only certain frames 312 may be associated with reference IDs 314. As such, the playback engine 120 may identify a nearest frame 312 having an associated reference ID 314, and may use the associated reference ID 314 as the transition reference ID 314N. In some embodiments, the playback engine 120 may identify the transition reference ID 314N based on a transition time. For example, a reference ID 314 may be associated with a playback time in the 2D video, and the playback engine 120 may identify the reference ID 314 at or near the transition time, using the identified reference ID 314 as the transition reference ID 314N. Once a transition reference ID 314N is identified, the playback engine 120 generates a transition initiation message 320 including the transition reference ID 314N and transmits the transition initiation message 320 to the 3D content engine 148 for processing.

The 3D content engine 148 receives the transition initiation message 320 and accesses 3D game data 330 from the database 162 using the transition reference ID 314N The 3D game data 330 may be, for example, 3D game data associated with the transition frame 312N, including data defining the 3D environment (e.g., the scene within the 2D video) and game state at the transition time. The 3D game data 330 may include data describing, for example, the geometry, color, texture, state and the like of the objects and background within a scene of the 2D video 310. The 3D game data includes data used to construct the 3D game environment 340.

Once identified, the 3D content engine 148 provides the 3D game data 330 to the game engine 118, which renders the 3D game environment 340 using the 3D game data 330 and the rendering engine 122. The user interface engine 124 (not shown in FIG. 3) manages control of the display 112, coordinates releasing control of the display from the 2D mode 334 to the 3D gaming mode 344, and vice-versa, and presents user controls to the user 102 (e.g., for navigation within a game environment 340 and playing a game).

In accordance with an embodiment, after generating the 3D game environment 340, the game engine 118 fades (e.g., using the rendering engine 122) the view of the 3D game environment 340 on top of the 2D video 310 (e.g., over the paused transition frame 312N) on the display 112. The view as shown on the display 112 of the 3D game environment 340 is constructed using the same resolution, aspect ratios, lighting, and the like from the transition frame 312N such that the view into the 3D game environment 340 initially resembles the transition frame 312N and, thus, will appear to have had a smooth transition from a perspective of the user 102. Data describing the resolution, aspect ratios, lighting, and the like is included in the 3D game data received from the game server 140.

As an example of the process described with respect to FIG. 3, the transition may happen completely in a virtual reality headset wherein the user transitions from watching a 360-degree video to a full 3D virtual reality game environment 340. Once a transition phase is completed, the user 102 may (e.g., through a virtual reality headset, keyboard controls, mouse, or other input devices) move around in all 6 degrees of freedom (e.g., translation and rotation) and explore the game scene and play the game.

Figure 4:
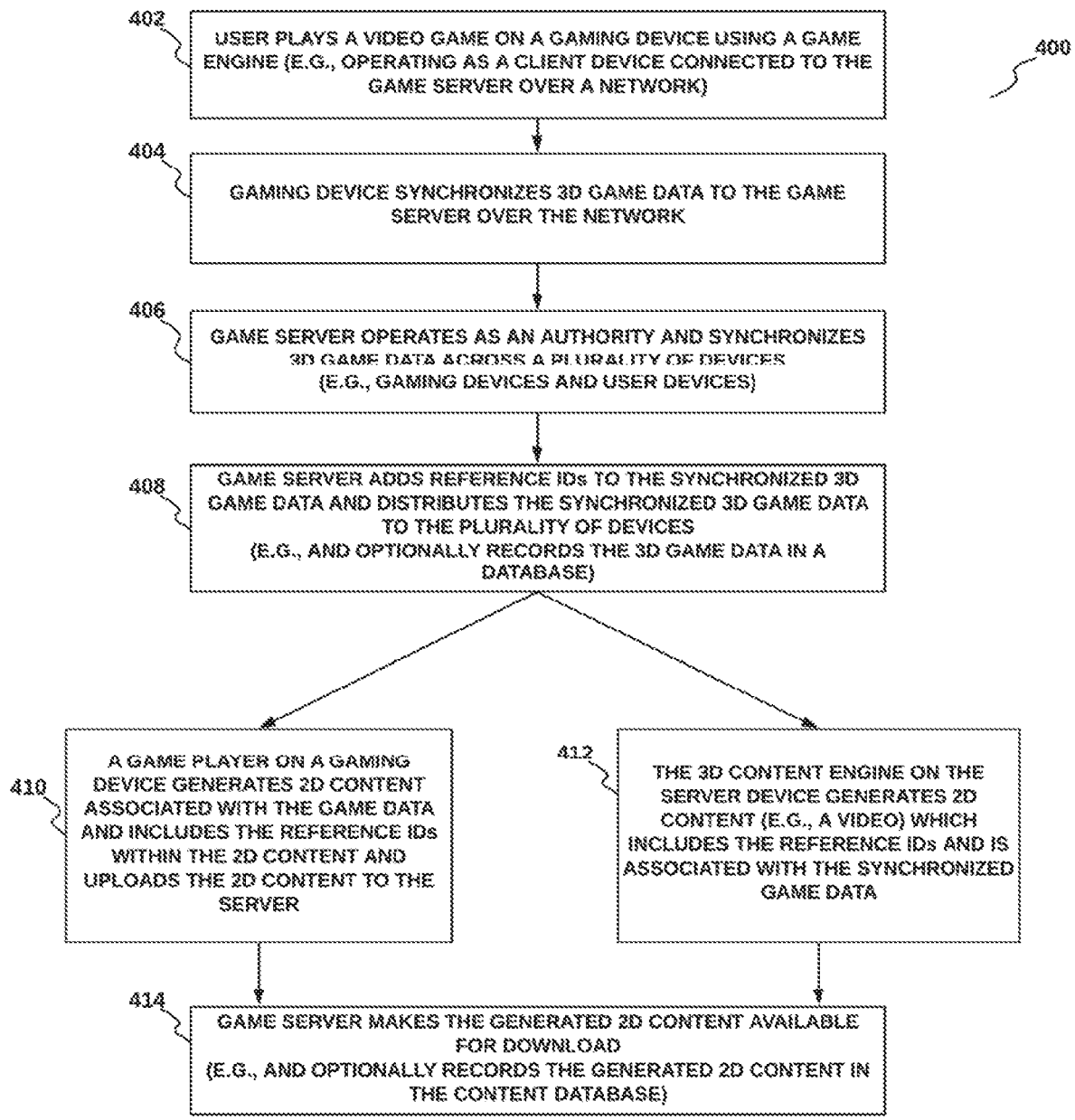
FIG. 4 illustrates a method for preparing 2D content and 3D content for use during transition events within a playback system, in accordance with an embodiment.

In accordance with an embodiment, FIG. 4 illustrates a method 400 for generating 2D video 310 and 3D game data 333 for use during a transition event. In accordance with an embodiment, at operation 402 of the method 400, a game player 126, 127 plays a video game on a gaming device 125 using a game engine 137. The gaining device 125 may be operating as a client device connected over the network 150 to a gamer server 140. The game server 140 may be operating as a game server device. In accordance with an embodiment, at operation 404 of the method 400, the gaming device 125 sends 3D game data to the game server over the network in order to synchronize the video game on the gaming device 125 with other versions of the same video game being played on other gaming devices. In accordance with an embodiment, at operation 406 of the method 400, the game server 140 operates as a game server authority and synchronizes 3D game data across a plurality of devices (e.g., including gaming devices 125 and user devices 104). The synchronizing including generating a single authoritative version of the 3D game data. In accordance with an embodiment, at operation 408 of the method 400, the 3D content engine 148 adds (e.g., merges) the synchronized 3D game data with reference IDs. A reference ID may link a subset of the 3D game data to a subset of 2D video data (e.g., a frame or set of frames). As such, when the 3D content engine 148 receives a request for 3D game data (e.g., as part of operation 208 of the method 200), the 3D game data may be retrieved using the reference ID within the request. As part of operation 408 of the method 400, the 3D content engine 148 distributes the synchronized 3D game data to the plurality of devices and optionally records the synchronized game data in the content database 162. As part of operation 408, the 3D game data with reference IDs may go through a formatting conversion before being stored in the content database 162 (e.g., encoded and or compressed).

In accordance with an embodiment, at operation 410 of the method 400, a game player 126, 127 on a gaming device 125 generates 2D video (e.g., using the game engine 137) associated with 3D game data. The 2D video may be a video generated by a virtual camera within the game environment controlled by the game player 126, 127 or by an automatic cinematography module following game play. The data describing the virtual camera is included in the 3D game data sent to the game server 140. As the game engine 137 generates 2D video from 3D game data, the game engine 137 includes the reference ID within the 3D game data into the 2D video in order to keep the 2D video and the 3D game data synchronized. In accordance with an embodiment, the generated 2D video is stored in the content database 162. In accordance with an embodiment, as an alternative to operation 410, or in addition to operation 410, at operation 412 of the method 400, the 3D content engine 148 on the server device 140 generates the 2D video including IDs using synchronized 3D game data (e.g., using an automatic cinematographer), In operation 410 and 412, as part of adding the IDs to the generated 2D video, each frame of the 2D video may be associated with a reference ID, and the associated 3D game data for the frame is also associated with the same reference ID. As such, in the example embodiment, each of the 2D frames are combined with a reference ID into a video content package and stored in the content database 162 or the content package is streamed to a user device 104 as part of operation 202 of the method 200. The operations 410, 412 are performed such that various elements or positions within the 2D video (e.g., frames of the video) are associated with various 3D game data by use of the reference IDs.

In accordance with an embodiment, as part of operation 414 of the method 400, the generated 2D video is made available for download and streaming to user devices 104 (e.g., as part of the method 200). As part of operation 414, the 2D video may be stored in the content database 162.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
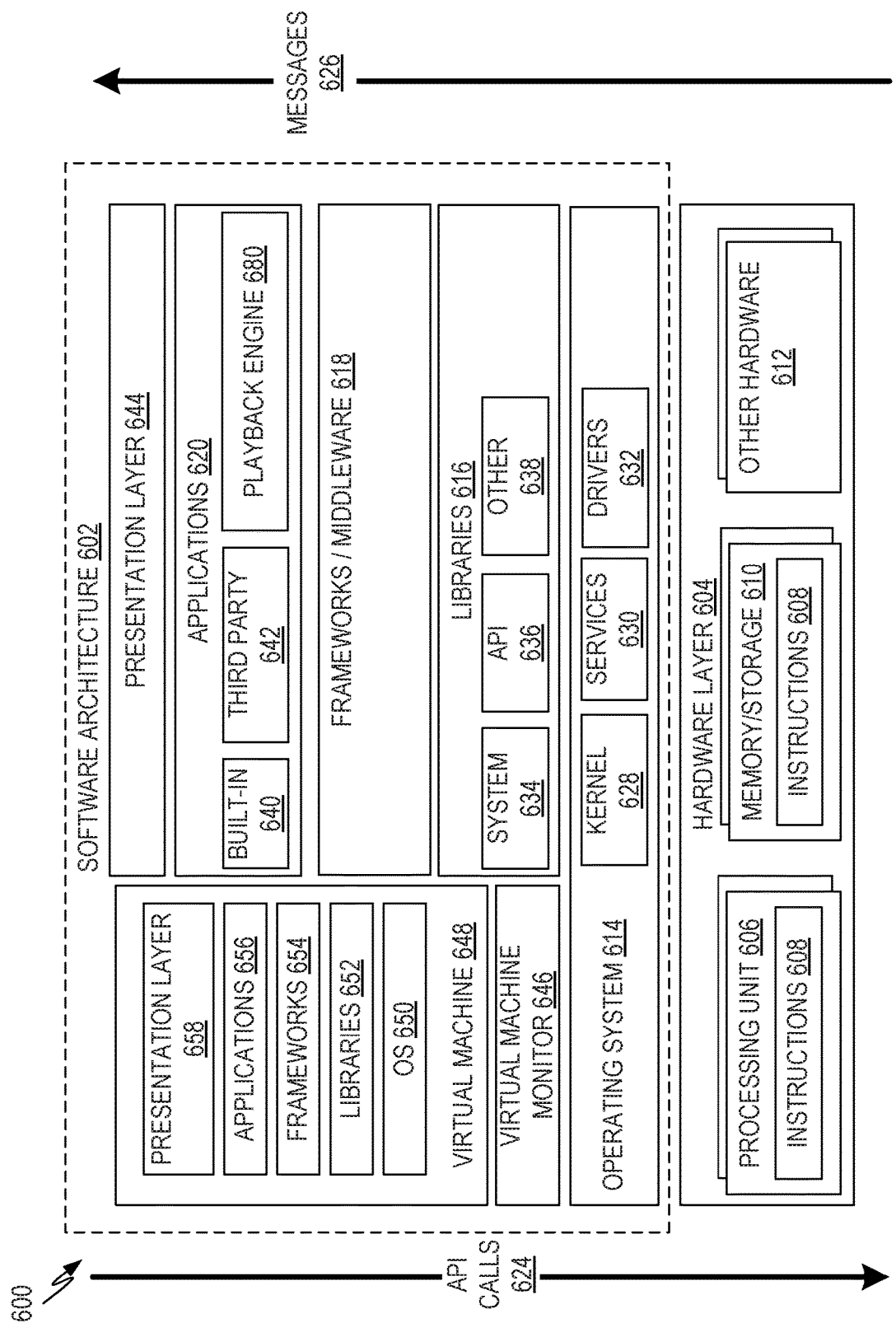
FIG. 5 is a block diagram illustrating an example software architecture 602, which may be used, in conjunction with various hardware architectures herein described, to provide transitioning between 2D environments (e.g., the 2D mode) and 3D environments (e.g., the 3D mode)

FIG. 5 is a block diagram 600 illustrating an example software architecture 602, which may be used, in conjunction with various hardware architectures herein described, to provide transitioning between 2D environments the 2D mode 334) and 3D environments (e.g., the 3D mode 344). A playback engine 680, which is shown in a layer of applications 620, may be similar to the playback system 200, or any of the various components thereof, but may be provided in whole or in part at other layers shown in FIG. 5. FIG. 5 is a non-limiting example of a software architecture 602, and it will be appreciated that many other architectures may be implemented to facilitate the functionality described herein. The software architecture 602 may execute on hardware such as a machine 700 of FIG. 6 that includes, among other things, processors 710, memory 730, and input/output (I/O) components 750. A representative hardware layer 604 is illustrated and can represent, for example, the machine 700 of FIG. 6. The representative hardware layer 604 includes a processing unit 606 having associated executable instructions 608. The executable instructions 608 represent the executable instructions of the software architecture 602, including implementation of the methods, modules, and so forth described herein. The hardware layer 604 also includes memory/storage 610, which also includes the executable instructions 608. The hardware layer 604 may also comprise other hardware 612.

In the example architecture of FIG. 5, the software architecture 602 may be conceptualized as a stack of layers where each layer provides particular functionality. For example, the software architecture 602 may include layers such as an operating system 614, libraries 616, frameworks or middleware 618, applications 620, and a presentation layer 644. Operationally, the applications 620 and/or other components within the layers may invoke application programming interface (API) calls 624 through the software stack and receive a response as messages 626. The layers illustrated are representative in nature and not all software architectures 602 have all layers. For example, some mobile or special purpose operating systems 614 may not provide the frameworks/middleware 618, while others may provide such a layer. Other software architectures 602 may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than by interfacing directly with the underlying operating system 614 functionality (e.g., kernel 628, services 630, and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system 614 or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. The third-party applications 642 may include an application developed using the Android™ or iOS™ software development kit (SDK) by an entity other than the vendor of the particular platform, and may be mobile software running on a mobile operating system 614 such as iOS™, Android™, Windows® Phone, or other mobile operating systems 614. The third-party applications 642 may invoke the API calls 624 provided by the mobile operating system, such as the operating system 614, to facilitate functionality described herein.

The applications 620 may use built-in operating system functions (e.g., kernel 628, services 630, and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures 602 use virtual machines. In the example of FIG. 5, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648, such as an operating system (OS) 650, libraries 652, frameworks 654, applications 656, and/or a presentation layer 658. These layers of software architecture executing within the virtual machine 648 can be the same as corresponding layers previously described or may be different.

Figure 6:
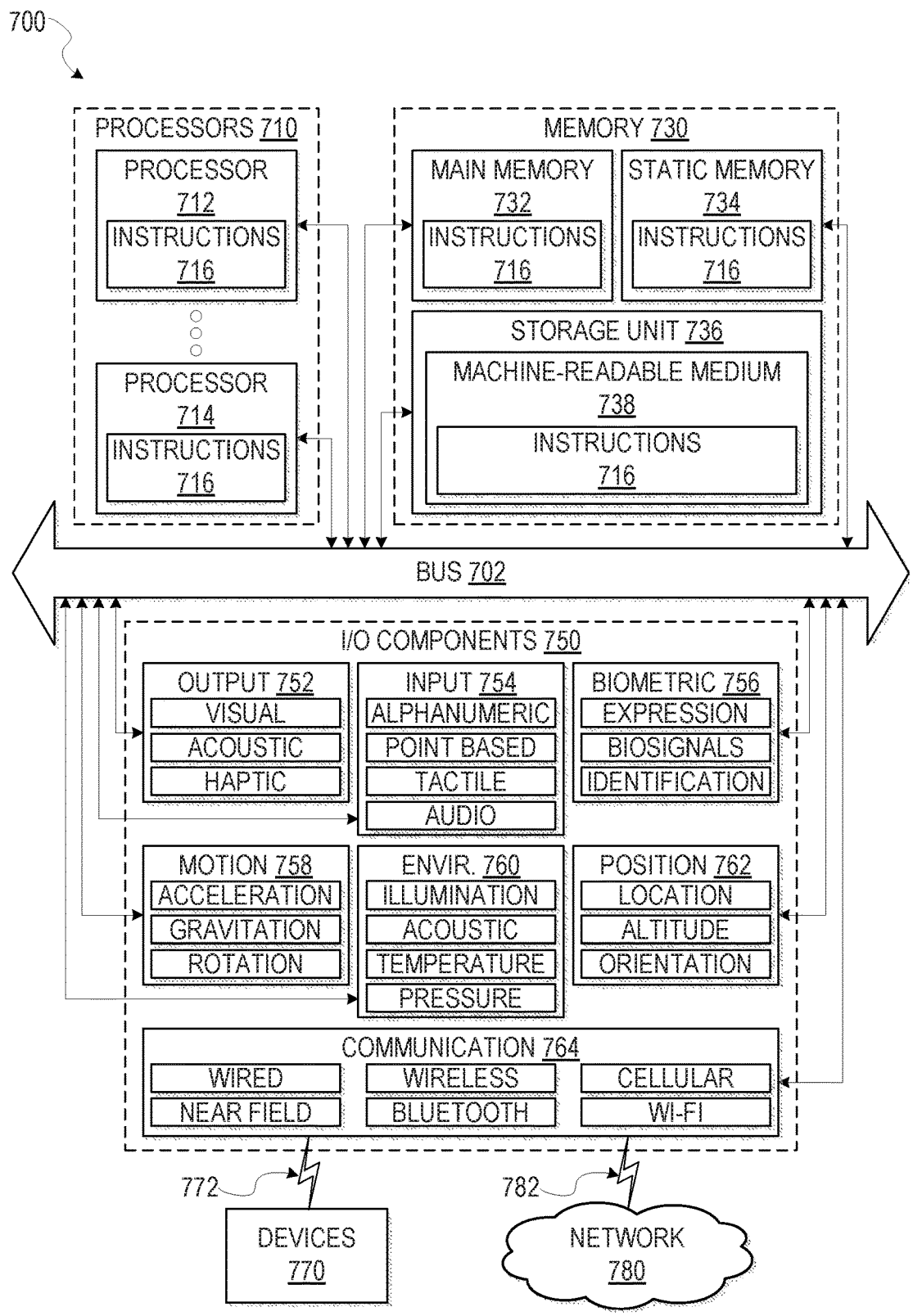
FIG. 6 is a block diagram illustrating components of a machine, according to some example embodiments, configured to read instructions from a machine-readable medium (e.g., a machine-readable storage medium) and perform any one or more of the methodologies discussed herein.

FIG. 6 is a block diagram illustrating components of a machine 700, according to some example embodiments, configured to read instructions 716 from a machine-readable medium 738 (e.g., a machine-readable storage medium) and perform any one or more of the methodologies discussed herein. Specifically, FIG. 6 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) may include, for example, a processor 712 and a processor 714 that may execute the instructions 716. The term "processor" is intended to include a multi-core processor 712 that may comprise two or more independent processors 712, 714 (sometimes referred to as "cores") that may execute the instructions 716 contemporaneously. Although FIG. 6 shows multiple processors 712, 714, the machine 700 may include a single processor 712 with a single core, a single processor 712 with multiple cores (e.g., a multi-core processor), multiple processors 712, 714 with a single core, multiple processors 712, 714 with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of the processors 710 are examples of machine-readable media 738.

As used herein, "machine-readable medium" means a device able to store the instructions 716 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific I/O components 750 that are included in a particular machine 700 will depend on the type of machine. For example, portable machines 700 such as mobile phones will likely include a touch input device or other such input mechanisms, while a headless server machine 700 will likely not include such a touch input device. It will be appreciated that the I/O components 750 may include many other components that are not shown in FIG. 6. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental environment components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental environment components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine 700 or any of a wide variety of peripheral devices (e.g., a peripheral device coupled via a USB).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

While illustrated in the Figures as groups of discrete components communicating with each other via distinct data signal connections, it should be noted that such components are in one embodiment, provided by a combination of hardware and software components, with some components being implemented by a given function or operation of a hardware or software system. In addition, many of the data paths illustrated are implementable by data communication occurring within a computer application or an operating system or over a network. The structure of the systems illustrated in Figures is thus provided for efficiency of teaching.

While illustrated in the block diagrams as groups of discrete components communicating with each other via distinct data signal connections, it will be understood by those skilled in the art that the example embodiments described herein are provided by a combination of hardware and software components, with some components being implemented by a given function or operation of a hardware or software system, and many of the data paths illustrated being implemented by data communication within a computer application or operating system. The example structure illustrated may provide for efficiency of teaching the example embodiments described herein.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

What is claimed is:

1. A system comprising:
a display device including one or more hardware processors and a memory, the display device including a playback engine that includes a 2D playback engine and a game engine, executable by the one or more hardware processors, configured to perform operations for presenting 2D content on the display device, the operations comprising:
receiving 2D content over a network streamed from a server device to the display device;
playing, using the 2D playback engine, the 2D content on the display device;
during the playing of the 2D content, receiving an indication of a transition event, the transition event having been initiated on-demand by a user; and
in response to the receiving of the indication of the transition event, pausing the playing of the 2D content, identifying a transition reference identifier (ID) based on a frozen frame of the 2D content, identifying 3D game data associated with the 2D content based on the transition reference ID, and transitioning the display device into a 3D game mode, the transitioning including providing, using the game engine and the 3D game data, a 3D game environment in which the user can play a game as described by the game data.

2. The system of claim 1, wherein the 2D content and the 3D game data are generated on a gaming device and streamed from the gaming device over the network to the server device.

3. The system of claim 1, wherein the 3D game data is generated on a gaming device and streamed from the gaming device over the network to the server device.

4. The system of claim 3, wherein the server device synchronizes game data from a plurality of gaming devices and acts as a game server wherein each of the gaming devices from the plurality of gaming devices acts as a game client.

5. The system of claim 1, wherein the server device includes a game engine, executable by the one or more hardware processors, configured to perform operations for generating the 2D content, the operations including using the game engine and the 3D data to generate the 2D content.

6. The system of claim 1, wherein the transition event is initiated at a transition frame during the displaying of the 2D content, and wherein the transition reference ID is associated with the transition frame.

7. The system of claim 1, further comprising:
a 3D content engine, executable by the one or more hardware processors on the server device, configured to perform operations comprising:
generating the one or more reference IDs;
associating the one or more reference IDs with the 3D game data; and
associating the one or more reference IDs with the 2D data.

8. A method comprising:
receiving 2D content streamed from a server device over a network;
playing, using a 2D playback engine, the 2D content on a display device;
during the playing of the 2D content, receiving an indication of a transition event, the transition event having been initiated on-demand by a user; and
in response to the receiving of the indication of the transition event, pausing the playing of the 2D content, identifying a transition reference identifier (ID) based on a frozen frame of the 2D content; identifying 3D game data associated with the 2D content based on the transition reference ID, and transitioning the display device into a 3D game mode, the transitioning including providing, using a game engine and 3D game data, a 3D game environment in which the user can play a game as described by the game data.

9. The method of claim 8, wherein the 2D content and the 3D game data are generated on a gaming device and streamed from the gaining device over the network to the server device.

10. The method of claim 8, wherein the 3D game data is generated on a gaming device and streamed from the gaming device over the network to the server device.

11. The method of claim 10, wherein the server device synchronizes game data from a plurality of gaming devices and acts as a game server wherein each of the gaming devices from the plurality of gaming devices acts as a game client.

12. The method of claim 8, wherein the server device includes a game engine, executable by the one or more hardware processors, configured to perform operations for generating the 2D content, the operations including using the game engine and the 3D data to generate the 2D content.

13. The method of claim 8, wherein the transition event is initiated at a transition frame during the displaying of the 2D content, and wherein the transition reference is associated with the transition frame.

14. The method of claim 8, further comprising:
a 3D content engine, executable by the one or more hardware processors on the server device, configured to perform operations comprising:
generating the one or more reference IDs;
associating the one or more reference Ds with the 3D game data; and
associating the one or more reference IDs with the 2D data.

15. A non-transitory computer-readable storage medium storing instructions thereon, which, when executed by one or more processors, cause the one or more processors to perform operations comprising:
receiving 2D content streamed from a server device over a network;
playing, using a 2D playback engine, the 2D content on a display device;
during the playing of the 2D content, receiving an indication of a transition event, the transition event having been initiated on-demand by a user; and
in response to the receiving of the indication of the transition event, pausing the playing of the 2D content, identifying a transition reference identifier (ID) based on a frozen frame of the 2D content; identifying 3D game data associated with the 2D content based on the transition reference ID, and transitioning the display device into a 3D game mode, the transitioning including providing, using a game engine and 3D game data, a 3D game environment in which the user can play a game as described by the game data.

16. The non-transitory computer-readable storage medium of claim 15, wherein the 2D content and the 3D game data are generated on a gaming device and streamed from the gaming device over the network to the server device.

17. The non-transitory computer-readable storage medium of claim 15, wherein the 3D game data is generated on a gaming device and streamed from the gaming device over the network to the server device.

18. The non-transitory computer-readable storage medium of claim 17, wherein the server device synchronizes game data from a plurality of gaming devices and acts as a game server wherein each of the gaming devices from the plurality of gaming devices acts as a game client.

19. The non-transitory computer-readable storage medium of claim 15, wherein the server device includes a game engine, executable by the one or more hardware processors, configured to perform operations for generating the 2D content, the operations including using the game engine and the 3D data to generate the 2D content.

20. The non-transitory computer-readable storage medium of claim 15, wherein the transition event is initiated at a transition frame during the displaying of the 2D content, and wherein the transition reference ID is associated with the transition frame.

\* \* \* \* \*

UNITED STATES PATENT AND TRADEMARK OFFICE
CERTIFICATE OF CORRECTION

PATENT NO. : 10,675,542 B2  
APPLICATION NO. : 16/388757  
DATED : June 9, 2020  
INVENTOR(S) : Sylvio Herve Drouin Page 1 of 1

It is certified that error appears in the above-identified patent and that said Letters Patent is hereby corrected as shown below:

On the Title Page

On page 2, in Column 2, under "Other Publications", Line 7, delete "dateed" and insert --dated-- therefor In the Claims In Column 20, Line 46, in Claim 8, delete "content;" and insert --content,-- therefor In Column 20, Line 55, in Claim 9, delete "gaining" and insert --gaming-- therefor In Column 21, Line 5, in Claim 13, after "reference", insert --ID--

In Column 21, Line 12, in Claim 14, delete "Ds" and insert --IDs-- therefor

In Column 21, Line 30, in Claim 15, delete "content;" and insert --content,-- therefor Signed and Sealed this  
Twelfth Day of January, 2021

Andrei Iancu  
*Director of the United States Patent and Trademark Office*